United States Patent [19]

McComas

[11] 4,449,679
[45] May 22, 1984

[54] MULTI ROLE AIRCRAFT

[75] Inventor: Jean McComas, West Babylon, N.Y.

[73] Assignee: Fairchild Industries, Inc., Germantown, Md.

[21] Appl. No.: 355,024

[22] Filed: Mar. 5, 1982

[51] Int. Cl.³ .......................... B64C 1/22; B64C 7/00
[52] U.S. Cl. ............................ 244/118.2; 244/137 R; 244/120; 89/37.5 R
[58] Field of Search .................. 244/137 R, 136, 120, 244/119, 117 R, 118.1, 118.2; 89/37.5 R

[56] References Cited

U.S. PATENT DOCUMENTS

| 3,017,137 | 1/1962 | Helmke et al. | 244/120 |
| 3,481,567 | 12/1969 | Stearman | 244/118.2 |
| 4,358,072 | 11/1982 | Williamson | 244/120 |

FOREIGN PATENT DOCUMENTS 2543479 4/1977 Fed. Rep. of Germany ... 244/118.2

OTHER PUBLICATIONS

"Plane Tilts for Take-Off", Popular Science, p. 113, Mar. 1952.
Jane's All the World Aircraft, "Bronco", pp. 387–388, 1977–1978.

Primary Examiner—Galen L. Barefoot
Attorney, Agent, or Firm—Michael W. York

[57] ABSTRACT

An aircraft having a plurality of fuselage members, one of which is provided with a replaceable and interchangeable payload carrying section. The replaceable section may be adapted to contain various equipment, ordinance and the like to satisfy different aircraft mission requirements. The replaceable and interchangeable sections are adapted to become an integral part of the fuselage section to which it is attached and permits the payload to be located in proximity to the aircraft's center of gravity such that variations in the equipment that constitutes the payload or discharge of all or part of the payload from the replaceable fuselage section will not substantially alter the aircraft's center of gravity.

8 Claims, 10 Drawing Figures

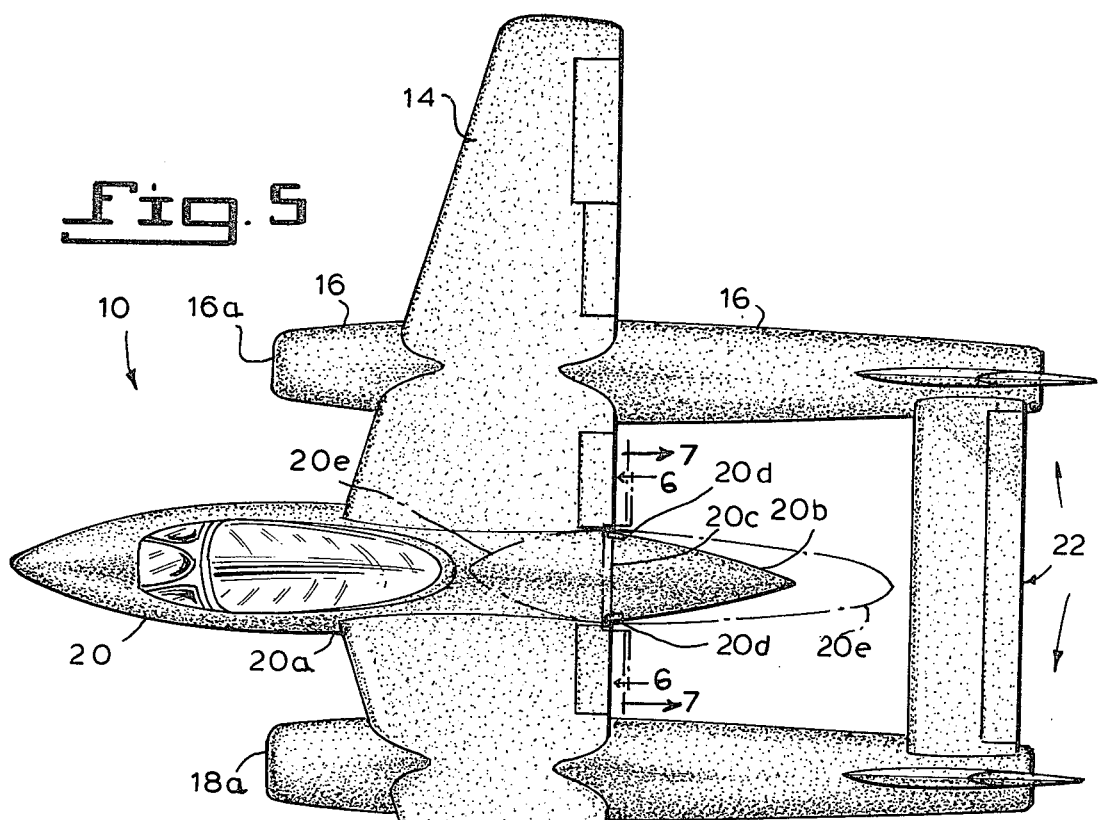
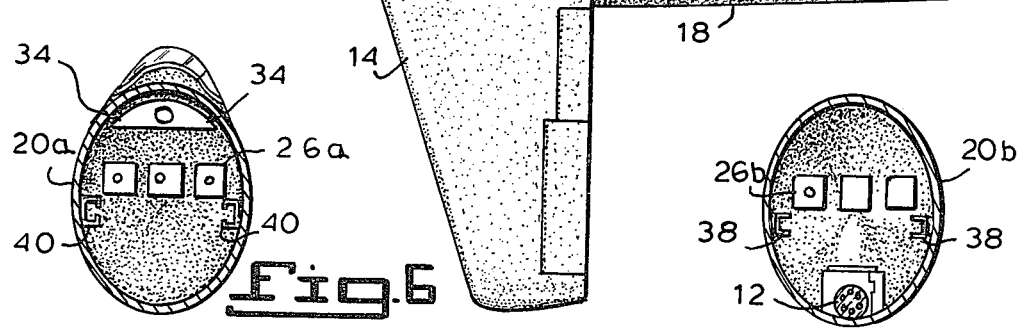
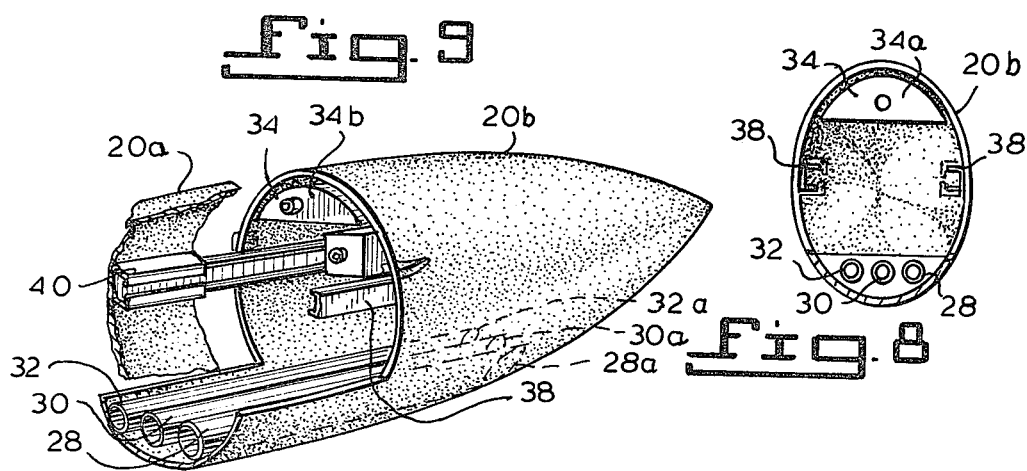

MULTI ROLE AIRCRAFT

REFERENCE TO RELATED APPLICATION

Reference is made to my copending U.S. Design patent application Ser. No. 245,554, filed on Mar. 19, 1981, and assigned to a common assignee, which discloses and claims the aesthetic aspects, to wit, The Design of an Aircraft, of a possible embodiment of the invention.

BACKGROUND OF THE INVENTION

With the refinement and sophistication of modern warfare, mission adaptability for aircraft has become an increasingly costly and often illusive objective, frequently best achieved or sought by compromises necessitated by the lack of appropriate equipment for the task at hand. Accordingly, the need to better attain these objectives by means of a versatile aircraft has never been in sharper focus than at the present. Consequently, a basic aircraft structure that could be readily adapted to rapidly changing circumstances and mission profiles simply and conveniently would obviate the need for an aircraft inventory of various types and configurations to meet the different mission requirements. Since these mission requirements are often times to diverse and highly refined, it has been difficult to provide such an aircraft having all of the necessary characteristics for these diversified missions. Those skilled in the art recognize that an aircraft that will be capable of performing such a variety of missions, as for example, air to air combat, air to ground combat, fire suppression, reconnaissance and so forth, usually results in an aircraft that does not perform to a high standard in every category. The difficulties in achieving acceptable performance is often compounded because even those particular missions identified above can require further definitization in that ordinance such as missiles of a particular type, size or configuration, or other alternative weapons might be more effectively used against a particular target. Consequently, the ability for an aircraft to accommodate such variations without undue performance handicaps is of paramount importance.

More than likely, the wide range of equipment, ordinance, armament types and the like that would be necessary to permit an aircraft to meet the requirements of such diverse missions, could have detrimental effects on its performance and stability. Accordingly, it is essential that any aircraft configuration take these factors into consideration so that the varying weights of such equipment that may be carried aboard the aircraft and expended during the course of a mission does not have a deleterious effect on its operation.

Additionally it should be borne in mind that aircraft that may be used in these situations are often operated from forward positions that lack many of the facilities available at home bases so that an aircraft that can adequately meet all of these requirements must do so under the most rudimentary circumstances and with minimal supporting equipment and personnel.

SUMMARY OF THE INVENTION

This invention relates to aircraft and more particularly to an aircraft that can be readily adapted to the requirement of a wide variety of mission objectives.

It is accordingly the primary object of the present invention to provide an aircraft which can accommodate many different types and sizes of payloads so that the aircraft can best fulfill a number of different mission objectives.

It is another object of the present invention to provide a basic aircraft capable of performing these various missions by incorporating different and interchangeable sections into the basic airframe structure.

It is also an object of the present invention to provide simple and adequate means to connect the basic aircraft with a variety of interchangeable sections.

It is also an object of the present invention to accommodate different types of material and equipment within the interchangeable sections such that the different sections and their equipment payload will furnish the means to satisfy specific aircraft mission requirements.

It is another object of the present invention to provide a basic aircraft that may be rapidly changed to meet different mission requirements to facilitate rapid turnaround and adaptability to meet rapidly changing circumstances.

It is also an object to provide within the interchangeable section of the aircraft all of the components required to fulfill specific missions such that the sections will for example contain a complete package of equipment for specific missions.

It is also an object of the present invention to provide an aircraft capable of accommodating various types of equipment, ordinance and armament types in such a manner as to minimize its effect on the stability of the aircraft.

It is also an object of the present invention to provide an aircraft that can accommodate a variety of equipment, ordinance and armament which can be expended from the aircraft while minimizing the effects of such expendables on the balance and stability of the aircraft.

It is also an object to provide an aircraft that is equipped with complimentary controls and equipment that will interface with the interchangeable and different sections to facilitate the aircraft crew to operate the equipment that is contained within the particular interchangeable section that is in place at a given time.

The present invention relates to an aircraft which may be adapted to perform a variety of diverse missions by means of a detachable aft fuselage section that is disposed in proximity to the aircraft's center of gravity and is adapted to accommodate the specific equipment necessary to accomplish a particular mission objective. The aft fuselage section is equipped with all of the equipment required for a particular mission and is adapted to cooperate with control systems provided in the aircraft's forward fuselage section to operate the equipment under the direction of an aircraft crew member or an automated control system that may be located elsewhere in the aircraft.

According to the present invention, the foregoing and other objects are attained by providing an aircraft having a plurality of fuselage members supporting an empennage. At least one fuselage terminating ahead of the empennage and having a fixed forward section and a separable aft section that is secured to it by attachment means. The interchangeable aft section is disposed in proximity to the aircraft's center of gravity and is adapted to accommodate material and equipment necessary for the aircraft to fulfill a specific mission requirement.

BRIEF DESCRIPTION OF THE DRAWINGS

The invention will be hereinafter more fully described with reference to the accompanying drawings in which:

FIG. 5 is a top plan view of the aircraft illustrated in FIG. 1 and showing an alternative embodiment of the present invention illustrated in phantom lines;

FIG. 6 is a sectional view taken on the line 6—6 in the direction of the arrows in FIG. 5 with schematic representations of certain components of the present invention;

FIG. 7 is a sectional view taken on the line 7—7 in the direction of the arrows in FIG. 5, and showing a schematic representation of a certain component of the present invention for a particular embodiment of the present invention;

FIG. 8 is an elevational view of an alternative embodiment of the aft fuselage section of the present invention;

FIG. 9 is a perspective view of a typical aft fuselage section showing some of the internal components and structural features in accordance with the teachings of the present invention.

DETAILED DESCRIPTION OF THE PREFERRED EMBODIMENTS

Figure 1:
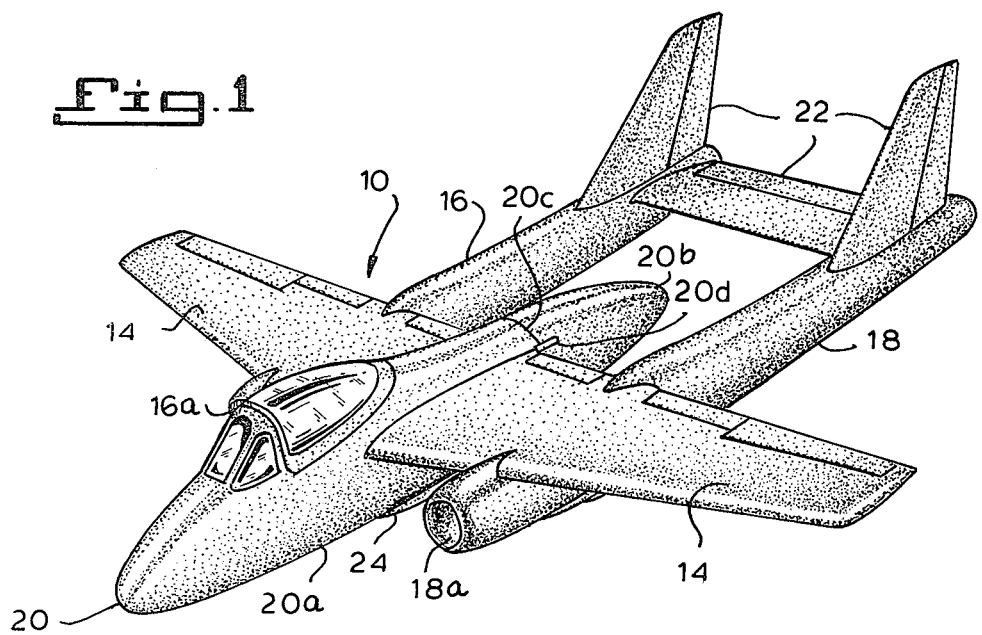
FIG. 1 is a perspective view of an aircraft configured in accordance with the teachings of the present invention.
Figure 2:
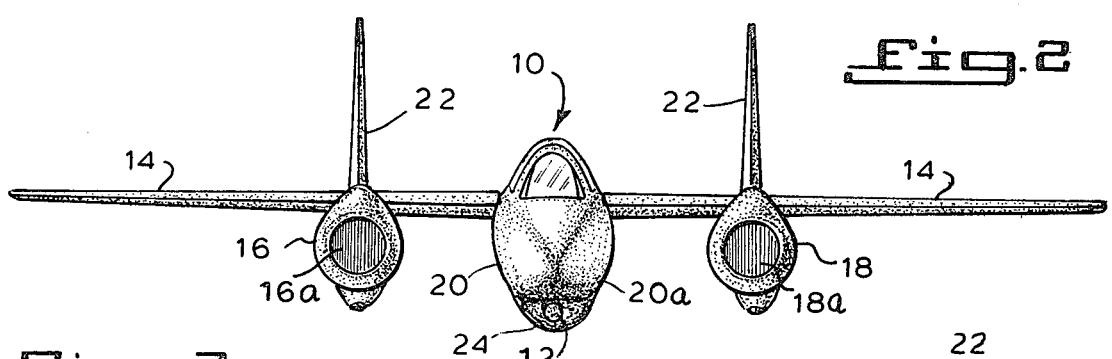
FIG. 2 is a front elevational view of the aircraft illustrated in FIG. 1.

Referring now to FIGS. 1 through 5 in the drawings it will be noted that an aircraft has been generally designated by the reference numeral 10. The aircraft is in accordance with the present invention, suitably configured so that it may be efficiently operated and provide optimum mission effectiveness as a close air support aircraft. That is to say, the aircraft as illustrated in these figures may be equipped with a weapon system such as that commonly referred to as the GAU 8 Gatling type weapon, which is proven to be highly effective against ground targets. The muzzle of this weapon is shown in the drawing figures and generally designated by the reference numeral 12.

The aircraft 10 is provided with wings 14 and a plurality of fuselage members 16, 18 and 20, as best illustrated in FIG. 1. In its preferred embodiment fuselage members 16 and 18 may house propulsion means (not shown) and support the empennage structure 22. Propulsion means inlets 16a and 18a are respectively situated at the forward end of the fuselage members 16 and 18 to furnish inlet air to the propulsion means (not shown) contained therein. The central fuselage member 20 contains the cockpit which embodies the crew stations for operation of the aircraft and its systems. As will be noted in the drawings the central fuselage member 20 consists of a forward section 20a and an aft section 20b which extends rearwardly and terminates ahead of the empennage 22. The aft section 22b of the central fuselage member has a protruding portion 24 which is adapted to extend longitudinally for some distance beneath the forward section 20a of the central fuselage 20 and may be appropriately faired to provide good aerodynamic flows and drag reduction in a manner well known to those skilled in the art.

Figure 3:
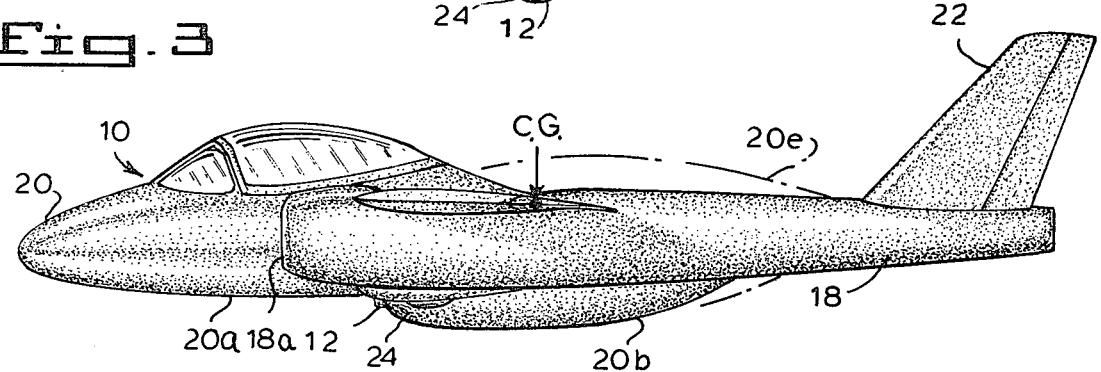
FIG. 3 is a side elevation of the aircraft illustrated in FIG. 1 and showing an alternative embodiment illustrated in phantom lines.
Figure 4:
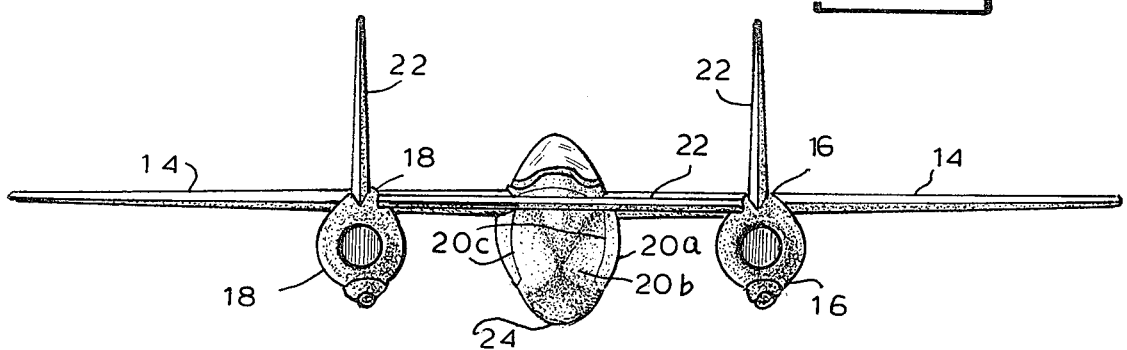
FIG. 4 is an elevational view of the rear of the aircraft illustrated in FIG. 1.
Figure 10:
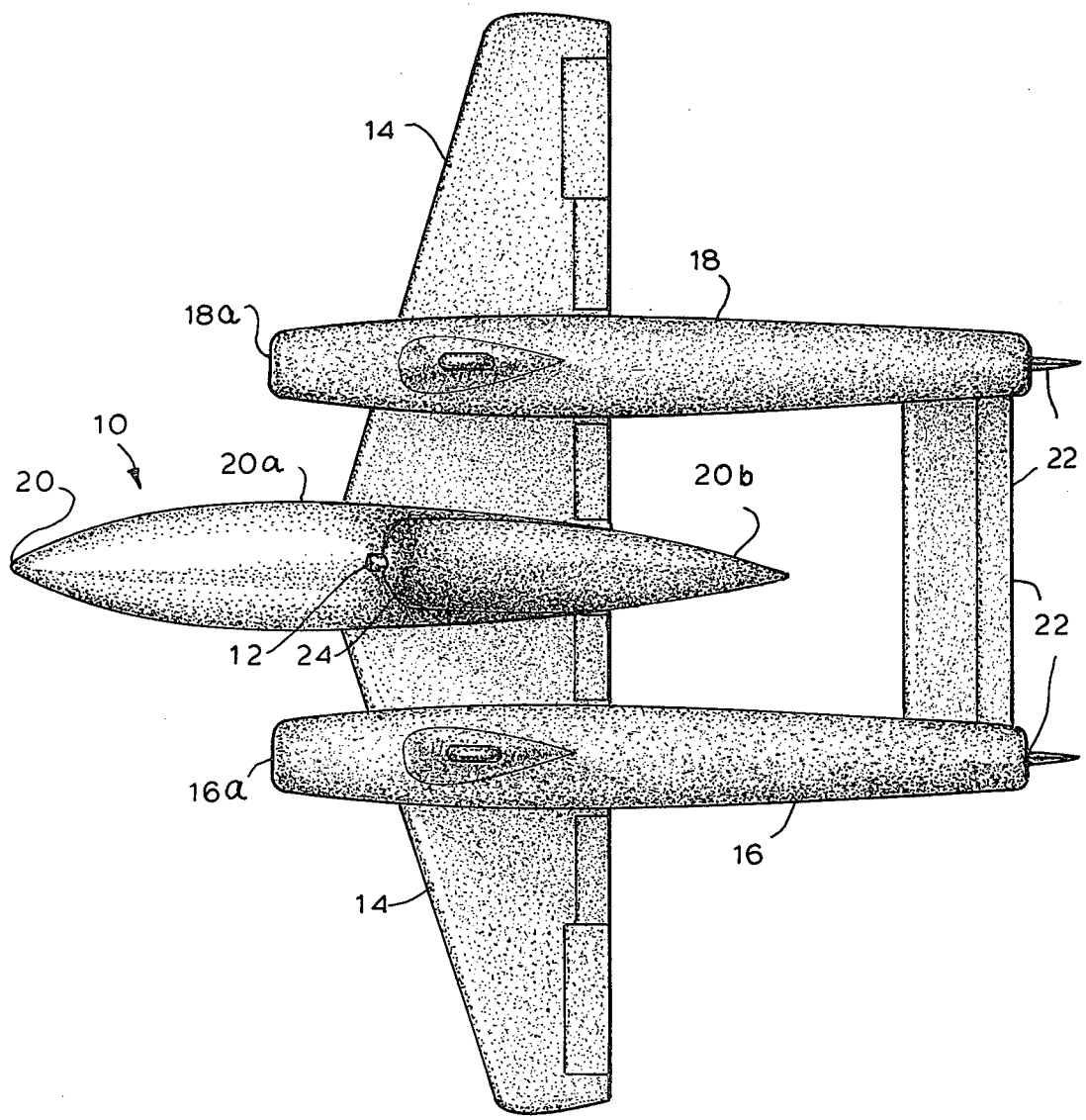
FIG. 10 is a bottom plan view of the aircraft of the present invention as shown in FIG. 1.

The location of the aircrafts 10 center of gravity is indicated by the symbol CG in FIG. 3 of the drawings. The aft fuselage section 22b of the central fuselage 20 is situated so that it, as well as its contents are relatively balanced about and in proximity to the aircraft CG. As a consequence, the aft fuselage section 22b, and the wide variety of prospective equipment that can be accommodated therein will minimize any excursion of the aircrafts CG that might be caused by variations in the weight of the equipment that constitutes the payload contained therein. Moreover, the substantial area and configuration of the aft fuselage section 22b as shown and alternate embodiments thereof as indicated in dotted lines in FIG. 5, permit great flexibility in the enveloped area that can accommodate a payload of greatly diversified configuration without incurring detrimental effects on the aircraft's stability and performance. It should however, be understood and appreciated that good practice would dictate that the placement and operation of expendables that constitute the payload should be such as to minimize the effects on the CG when such equipment is expended. As best seen in FIGS. 1, 4 and 5 the central fuselage aft section 20b is mated with the forward fuselage section 20 at a surface indicated by the line 20c and is secured thereto by latching sections 20d as seen in FIGS. 1 and 5. Other relevant structure to enable the central fuselage sections 20a and 20b to achieve the required structural integrity as well as other features will be described in greater detail as we progress.

In the embodiment illustrated in the drawing FIGS. 1, 2, 3, 4 and 10, the aircraft is depicted as being best suited to a close air support role in that a Gatling type weapon such as the GAU 8 is shown mounted in the center aft fuselage section 20b.

The present arrangement also provides an ideal installation for such a weapon in that the muzzle 12 of the weapon is substantially removed from the propulsion means inlets 16a and 18a which as previously mentioned, are situated at the forward end of the respective fuselage members 16 and 18. Because the weapon muzzle 12 is remotely located with respect to these inlets 16a and 18a, the gases produced during operation of the weapon, commonly referred to as gun gases, cannot be ingested by the propuslsion means and cause undesirable effects on engine operation. Moreover, since the weapon muzzle 12 is situated on the aircraft's centerline designated by the symbol CL in FIGS. 2 and 10, any recoil of the weapon, which can be considerable when it is being fired at a high rate, will not instigate yaw forces that would otherwise affect the stability of the aircraft 10.

In such installations ammunition for the weapon is generally accommodated and fed to the weapon from an ammunition drum (not shown). This drum together with any other appurtenances necessary for the operation of the weapon, such as firing controls and the like, may readily be accommodated within the space defined by the center aft fuselage section 20b. Such firing control systems may be contained within a pair of so called "black boxes" 26a and 26b, as seen in FIGS. 6 and 7. The "black box" firing control mechanism 26 may incorporate all of the customary devices associated with the actual weapon, in this case the GAU 8. The firing control mechanism 26 is comprised partially with a "black box" 26a that may be situated in the forward center fuselage 20a and a similar "black box" 26b that may be disposed within the aft fuselage section 20b such that when the aft fuselage section 20b and forward fuselage section 20a are cooperatively engaged, the firing control mechanism comprises a completed package that may be operated at the direction of a crew member or automated firing system disposed elsewhere in the aircraft, as for example, in the aircraft cabin. The connection between the components 26a and 26b of the firing control system situated within the forward fuselage section 20a and aft fuselage section 20b respectively, may be by the customary wiring harness and appropriate connectors (not shown) of a type well known in the art.

If reference is made to FIG. 8 in the drawings it will be noted that an aft fuselage section 20b corresponding to the phantom line alternative embodiment in FIG. 1 has been illustrated. Such an embodiment may accommodate ordinance or equipment that may require additional space so that the aft fuselage configuration would be modified. Naturally such alternate configurations would be aerodynamically integrated into the forward fuselage section 20b in accordance with the present day standards of those skilled in the art.

Referring now to FIG. 9 in the drawings, the aft fuselage section 20b is shown detached and with schematic representations of other types of ordinance that may be accommodated in accordance with the teachings of the present invention. As an example, three missile launch tubes 28, 30 and 32 are shown and the portion of the firing control mechanism 34 to actuate the missiles contained within the launch tubes 28, 30 and 32 also situated within the aft fuselage section 20b, as shown. In a manner similar to that described previously, the firing control mechanism 34 for the missiles within the tubes will consist of two major components 34a contained within the forward fuselage section 20a, and 34b contained within the aft section 20b, as best seen in FIGS. 6, 8 and 9 in the drawings. It should also be appreciated that these launch tubes 28, 30 and 32 could be provided with appropriate exhaust outlets 28a, 30a and 32a as shown on dotted lines in FIG. 9, to permit the exhaust gases to exit from the rear of the aft fuselage section 20b.

If reference is made to FIG. 9 in the drawings, it will be noted that the aft section 20b of the fuselage member 20 is provided with a plurality of U shaped channel members 38 which are fixed to the aft section 20b in any well known manner. These channel members 38 extend generally in longitudinal direction and protrude a substantial distance from the aft section 20b toward the forward fuselage section 20a. The forward fuselage section 20a is furnished with a plurality of C shaped receiver members 40, one of which is partially shown in FIG. 9 in the drawings. These C shaped receiver members 40 are positioned in longitudinal direction that is complementary to the direction of the previously mentioned U shaped members and are fixed to the forward fuselage section 20a and will correspond in number to the number of channel members 38 that are provided in the aft fuselage section 20b. As a consequence of this arrangement, when the aft fuselage section 20b is mated with the forward section 20a, each of the C shaped members 40 will receive the corresponding U shaped channel member 38 and thereby support and align the forward and aft sections 20a and 20b to provide the structural integrity required and permit the various components situated in the forward and aft sections as previously described, to interface. As previously indicated, suitable latching members 20d may be utilized to secure the forward aft sections 20a and 20b as well as permit rapid separation of the aft section 20b from the forward section 20a.

Note should also be taken of the fact that the present embodiment of the invention permits ready access to the forward section 20a from the rear of the aircraft 10 since the horizontal tail surfaces are elevated a sufficient distance to permit the aft section 20b to be positioned, connected or removed without difficulty.

It should be noted that the present invention has been described with reference to certain preferred embodiments, however, it should be understood that variations and modifications may be made within the spirit and scope of the invention as defined in the appended claims.

What is claimed is:

1. An aircraft comprising a fuselage member, propulsion means for the aircraft disposed in a spaced relationship to said fuselage member, said fuselage member including a forward section and a separable aft section, said aft section being located in proximity to said aircraft's center of gravity, said aft section including a protruding portion, said protruding portion extending forward from said aft section, said protruding portion having a forward end portion containing discharge means in communication with the interior of said aft section for material contained within said aft section to be discharged from said aircraft through said forward end portion means whereby said aft section and said forward section are integrally connected to form a single fuselage member, said fuselage connecting means comprising complementary members extending between said forward section and said aft section in a substantially longitudinal direction, said complementary members being cooperatively engaged with one another, and latching means adapted to secure said forward section and said aft section in operative engagement.

2. The aircraft of claim 1 wherein said discharge means comprises a weapon.

3. The aircraft of claim 2 wherein said propulsion means has at least one inlet and said weapon has a muzzle remotely located with respect to said inlet.

4. The aircraft of claim 3 wherein the muzzle of said weapon is located on the centerline of said aircraft.

5. The aircraft of claim 4 wherein said weapon comprises a gatling type weapon.

6. The aircraft of claim 2 wherein said weapon comprises at least one missile launch tube.

7. The aircraft of claim 6 wherein said missile launch tube has an outlet to permit exhaust gases to exit from the rear of said aft section of said fuselage member.

8. The aircraft of claim 1 wherein said complementary members comprise a plurality U-shaped channel members and a plurality of C-shaped receiver members that receive the U-shaped channel members.

* * * * *